US010597909B2

(12) United States Patent
Ishiguro et al.

(10) Patent No.: US 10,597,909 B2
(45) Date of Patent: Mar. 24, 2020

(54) VEHICLE DOOR LATCH DEVICE

(71) Applicant: GECOM CORPORATION, Greensburg, IN (US)

(72) Inventors: Katsuyuki Ishiguro, Novi, MI (US); Cristian Damboiu, Novi, MI (US); Bryan Farris, Novi, MI (US); Brian Kepler, Novi, MI (US); Aaron Martin, Novi, MI (US)

(73) Assignee: GECOM CORPORATION, Greensburg, IN (US)

( * ) Notice: Subject to any disclaimer, the term of this patent is extended or adjusted under 35 U.S.C. 154(b) by 313 days.

(21) Appl. No.: 15/547,195

(22) PCT Filed: Feb. 12, 2015

(86) PCT No.: PCT/JP2015/053873
§ 371 (c)(1),
(2) Date: Jul. 28, 2017

(87) PCT Pub. No.: WO2016/129089
PCT Pub. Date: Aug. 18, 2016

(65) Prior Publication Data
US 2018/0016818 A1    Jan. 18, 2018

(51) Int. Cl.
*E05B 79/00* (2014.01)
*B60R 16/02* (2006.01)
(Continued)

(52) U.S. Cl.
CPC .............. *E05B 79/00* (2013.01); *B60J 5/00* (2013.01); *B60R 16/02* (2013.01);
(Continued)

(58) Field of Classification Search
CPC ...... E05B 79/00; E05B 79/08; E05B 63/0056; E05B 77/28; E05B 77/283; E05B 77/287;
(Continued)

(56) References Cited

U.S. PATENT DOCUMENTS 3,072,340 A * 1/1963 Dean ...................... H01R 13/46
439/291
3,753,212 A * 8/1973 Yamada ................. H01R 13/28
439/358
(Continued)

FOREIGN PATENT DOCUMENTS

JP          2948491 B2    6/1996
JP       H09-306584 A   11/1997
(Continued)

OTHER PUBLICATIONS

International Search Report Corresponding to PCT/JP2015/053873 dated Apr. 28, 2015.
(Continued)

*Primary Examiner* — Nathan Cumar
(74) *Attorney, Agent, or Firm* — Davis & Bujold PLLC; Michael J. Bujold

(57) ABSTRACT

A door latch device which allows shared use of a connector for use in door latch devices equipped with standard electric components and a connector for use in door latch devices equipped with special electric components in addition to the standard electric components, thereby achieving an increase in the efficiency of the work of connecting to an external connector and a reduction in costs. A connector (32) of a standard switch plate (26) has a coupling hole (51) which penetrates, in the connecting direction of the external connector, a portion having no standard connecting terminals (304). The coupling hole (51) can be fitted with another switch plate (46) that allows the passage of electric current through electric components different than the standard electric components.

7 Claims, 13 Drawing Sheets

(51) Int. Cl.
*E05B 85/02* (2014.01)
*B60J 5/00* (2006.01)
*E05B 79/08* (2014.01)
*E05B 77/28* (2014.01)
*E05B 81/54* (2014.01)
*E05B 63/00* (2006.01)
*H01R 13/514* (2006.01)
*H01R 27/02* (2006.01)
*E05B 81/06* (2014.01)
*E05B 81/72* (2014.01)
*E05B 81/70* (2014.01)
*E05B 81/64* (2014.01)
*E05B 81/16* (2014.01)

(52) U.S. Cl.
CPC .......... *E05B 63/0056* (2013.01); *E05B 77/28* (2013.01); *E05B 79/08* (2013.01); *E05B 81/54* (2013.01); *E05B 85/02* (2013.01); *H01R 13/514* (2013.01); *H01R 27/02* (2013.01); *E05B 81/06* (2013.01); *E05B 81/16* (2013.01); *E05B 81/64* (2013.01); *E05B 81/70* (2013.01); *E05B 81/72* (2013.01)

(58) Field of Classification Search
CPC .......... E05B 81/54; E05B 81/06; E05B 81/16; E05B 85/02; E05B 81/70; E05B 81/72; B60J 5/00; B60J 5/02; B60J 5/04; B60R 16/02; B60R 16/0207; H01R 13/514; H01R 27/02

USPC ........................................................ 292/337
See application file for complete search history.

(56) References Cited

U.S. PATENT DOCUMENTS

| | | | | |
|---|---|---|---|---|
| 5,564,308 | A | * 10/1996 | Hoshikawa | E05B 81/25 74/89.14 |
| 5,746,076 | A | * 5/1998 | Inoue | E05B 81/06 70/277 |
| 2002/0106942 | A1 | * 8/2002 | Sakurai | H01R 13/518 439/701 |
| 2012/0238123 | A1 | * 9/2012 | Boemmel | H01R 13/516 439/345 |

FOREIGN PATENT DOCUMENTS

| | | |
|---|---|---|
| JP | 2000-160900 A | 6/2000 |
| JP | 3322572 B2 | 9/2002 |
| JP | 2005-163456 A1 | 6/2005 |
| JP | 2006-049052 A | 2/2006 |

OTHER PUBLICATIONS

Written Opinion Corresponding to PCT/JP2015/053873 dated Apr. 28, 2015.

* cited by examiner

VEHICLE DOOR LATCH DEVICE

TECHNICAL FIELD

The present invention relates to a vehicle door latch device.

BACKGROUND OF THE INVENTION

As described in Patent Literatures 1 and 2, a door latch device comprises an electric actuator capable of switching a locking/unlocking mechanism to a locked state or an unlocked state. The actuator comprises a locking/unlocking motor which is a standard electric part, a detection switch which is a standard electric part for detecting a locking state and an unlocking state, and a switch plate (a switch base in Patent Literature 1) for conductive each standard electric part.

As described in Patent Literature 3, in addition to the locking/unlocking motor (a locking motor in Patent Literature 3) and the detection switch which are standard electric parts, there is also a door latch device equipped with an actuator having a double locking motor (a deadlocking motor in Patent Literature 3) which is a special electrical part preventing that the locking/unlocking mechanism is illegally switched to the unlocking state.

PRIOR ART

Patent Literatures

Patent Literature 1: JP2948491B2
Patent Literature 2: JP3322572B2
Patent Literature 3: JP-Hei09-306584A

SUMMARY OF THE INVENTION

Problem to be Solved by the Invention

As described in Patent Literatures 1 to 3, an arrangement of each electric part and a shape of the switch plate to energize each electric part are different between a standard type door latch device equipped with the standard electric parts (the aforementioned locking/unlocking motor and detection switch) and a special type door latch device equipped with the special electric parts (the double locking motor) in addition to the standard electric parts, so that it is not possible to use switch plates in the same shape. Therefore, it is necessary to separately manufacture dedicated switch plates having a shape suitable for each door latch device.

As described in Patent Literature 3, in the special type door latch device, two connectors are provided on the switch plate, and the standard electric parts and the special electric parts are separately energized by the respective connectors. In this way, in the door latch device provided with two connectors on the switch plate, two external connectors connected to the respective connectors are also required, so that the connecting work between connectors is complicated and the working efficiency is lowered.

In view of the above problems, it is an object of the present invention to provide a door latch device which is able to improve efficiency of connection work with an external connector and to reduce costs by sharing a connector used for a door latch device equipped with standard electric parts and a connector used for a door latch device equipped with special electric parts in addition to the standard electric parts.

According to the present invention, the above problem is solved in the following manner.

A first invention comprises:
a casing;
a standard electric part disposed in the casing;
a standard switch plate disposed in the casing and conductive to the standard electric part; and
a connector provided on the standard switch plate and having a standard connection terminal electrically connected to an external connector,
wherein the connector, in a portion not having the standard connection terminal, has a connecting hole which penetrates in the connection direction of the external connector.

A second invention comprises:
a casing;
a standard electric part and a special electric part disposed in the casing;
a standard switch plate disposed in the casing and conductive to the standard electric part;
a special switch plate disposed in the casing and conductive to the special electric part;
a connector provided on the standard switch plate and having a standard connection terminal electrically connected to an external connector; and
a connecting portion provided on the special switch plate and having a special connection terminal electrically connected to the external connector,
wherein the connector, in a portion not having the standard connection terminal, has a connecting hole which penetrates in the connection direction of the external connector, and the connecting portion of the special switch plate is fitted in the connecting hole.

A third invention, in the first or second invention, is that the connector is a female connector in which the standard connection terminal is projected internally, and the connecting hole is provided in a wall portion of a base end portion of the female connector.

A forth invention, in the second invention, is that an end surface of the connecting portion is aligned with the same surface as an end surface of the opening portion of the connecting hole, when the connecting portion of the special switch plate is fitted in the connecting hole.

A fifth invention, in the fourth invention, is that the connecting portion is fitted in the connecting hole so that the connecting hole and the connecting portion have a same cross-sectional shape and an outer peripheral surface of the connecting portion comes into surface contact with the inner peripheral surface of the connecting hole.

A sixth invention, in any one of the second to fifth inventions, is that a bent portion bent in a plate thickness direction of the standard switch plate is formed at an end portion of the standard switch plate, the connector is provided on a surface of the bent portion that is opposite to the standard switch plate, the connecting portion of the special switch plate penetrates the bent portion and is fitted into the connecting hole from the opposite side of the connector.

Advantages of the Invention

According to the present invention, just by fitting special switch plate conductive to special electric part in the connection hole of the connector provided on the standard switch plate, it becomes possible to share the connector used for the door latch device equipped with the standard electric parts and the connector used for the door latch device equipped with the special electric parts in addition to the standard electric parts, thus, efficiency of connection work with an external connector is improved and cost reduction become possible.

EMBODIMENTS OF THE INVENTION

One embodiment of the present invention will be described with reference to the drawings.

Figure 1:
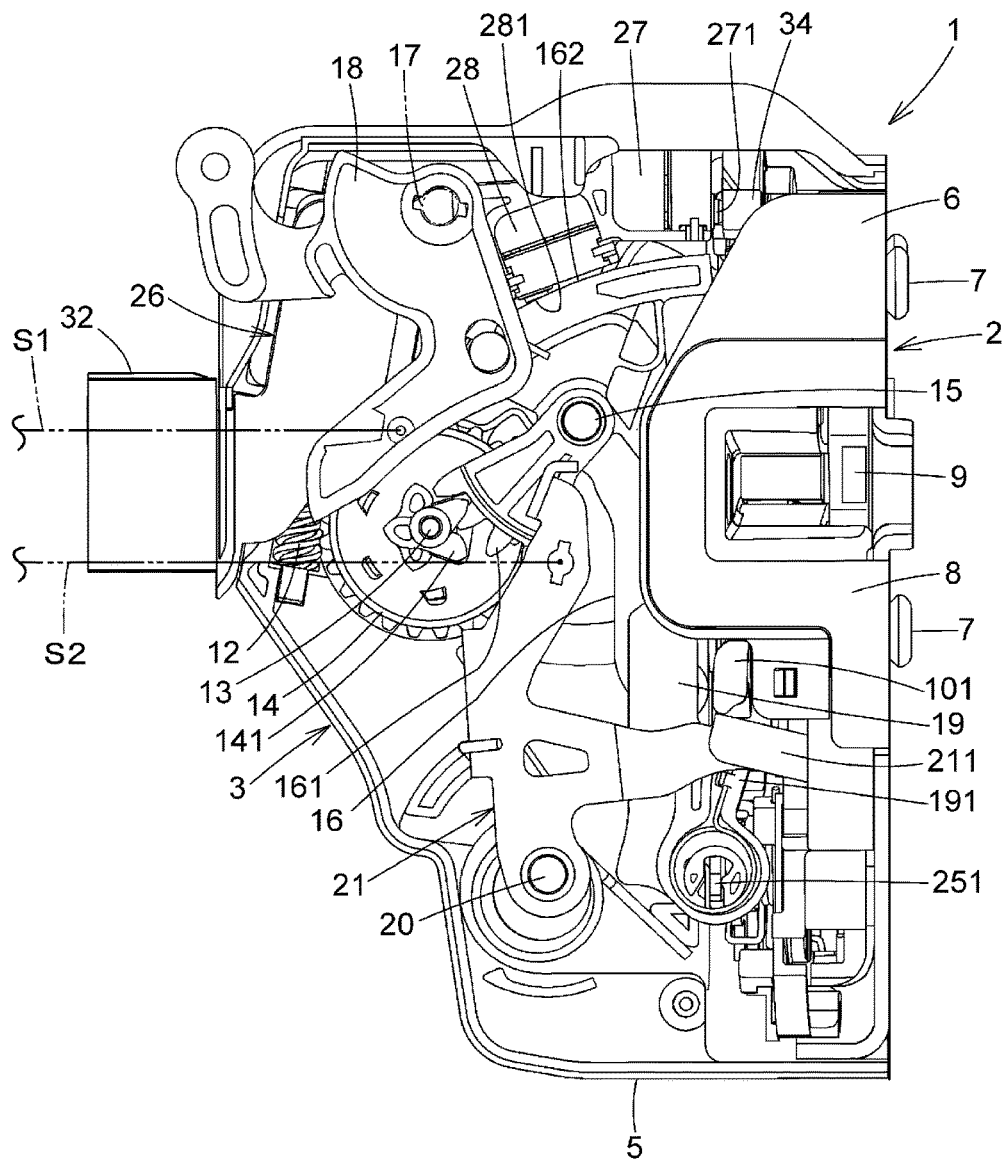
FIG. 1 is a side view of a standard type door latch device according to the present invention viewed from the vehicle interior side.
Figure 2:
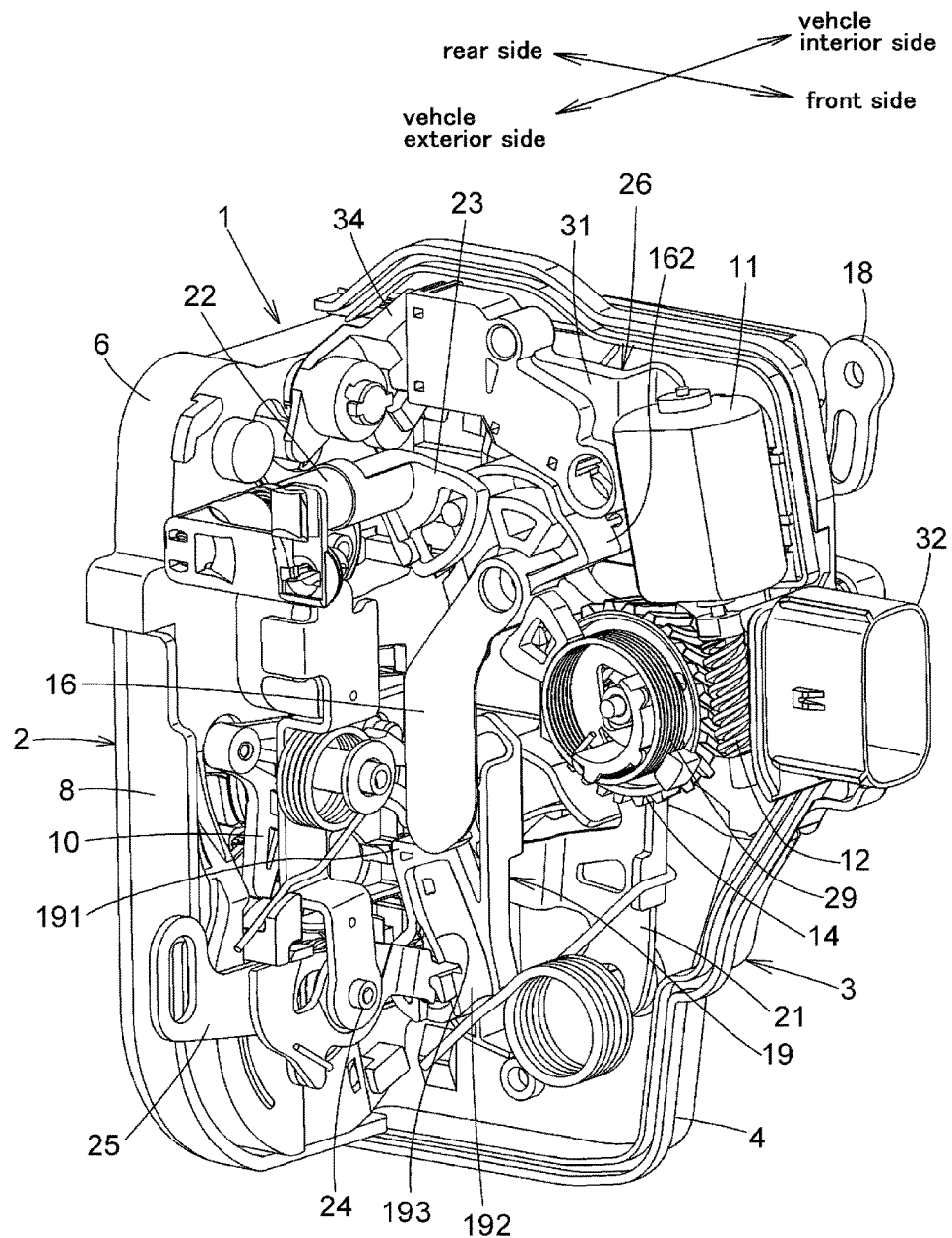
FIG. 2 is a perspective view of the standard type door latch device viewed from the front obliquely of the vehicle.

As shown in FIGS. 1 and 2, a door latch device 1 is provided in a rear end portion of a front door (hereinafter referred to as a door) of a vehicle, and comprises an engagement unit 2 for holding the door in a closed position and an actuator unit 3 integrally coupled to the engagement unit 2. The door latch device 1 is a standard type comprising the standard electric parts such as a locking/unlocking motor 11, a door opening/closing detection switch 27, and a locking/unlocking detection switch 28, etc. that they will be described later.

In addition, in order to clearly show the internal structure of the actuator unit 3, in FIG. 1, a cover 4 that covers a side surface at the vehicle interior side of the actuator unit 3 is omitted, in FIG. 2, a casing 5 that covers a side surface at the vehicle exterior side of the actuator unit 3 on which the cover 4 is attached is omitted.

The engagement unit 2 comprises:
a box-shaped body 6 made of synthetic resin;
a metal cover plate 8 fixed to the rear surface of the body 6 and fixed to a rear portion of an inner panel (not shown) inside the door together with the body 6 by a plurality of bolts 7;
a latch 9 disposed in an internal space between the body 6 and the cover plate 8, and engageable with a striker (not shown) on a side of the vehicle body;
a ratchet (not shown) disposed in the internal space between the body 6 and the cover plate 8 and preventing rotation of the latch 9 to an opening direction (a direction for releasing engagement with the striker) by engaging with the latch 9; and
an opening lever 10 rotating integrally with the ratchet.

Since the engagement unit 2 is well known and is not directly related to the present invention, a detailed description thereof will be omitted.

The actuator unit 3 comprises:
a synthetic resin casing 5 as described above fixed to the body 6;
a locking/unlocking motor 11 disposed in the casing 5 and rotating forward and reverse based on operation of a remote control switch, etc. (not shown);
a worm 12 fixed to the rotating shaft of the locking/unlocking motor 11;
a worm wheel 14 engaged with the worm 12 and pivotally mounted on the casing 5 by a shaft 13 facing a vehicle interior and exterior direction;
a locking/unlocking lever 16 pivotally mounted on a casing 5 by a shaft 15 facing a vehicle interior and exterior direction, and rotatable to an unlocking position that enables the open operation of the door and a locking position that disables the open operation of the door;
a knob lever 18 pivotally mounted by a shaft 17 which is provided on the cover 4 and faces an vehicle outward direction, and connected to a locking knob (not shown) for manual operation provided on the vehicle interior side of the door by a motion transmitting member S 1 such as a cable;
an opening link 19 rotatable to an unlocking position and a locking position in conjunction with the locking/unlocking lever 16;
an inside lever 21 pivotally mounted on a casing 5 by a shaft 20 facing a vehicle interior and exterior direction, and connected to an inside handle (not shown) for the door opening operation provided on the vehicle interior side of the door by a motion transmitting member S 2 such as a cable;
a key lever 23 pivotally mounted on a casing 5 by a shaft 22 facing a vehicle interior and exterior direction, and connected to a key cylinder (not shown) provided on the vehicle exterior side of the door by a rod, etc. (not shown);
an outside lever 25 pivotally mounted on the body 6 by a shaft 24 in a front-rear direction, and connected to an outside handle (not shown) provided on the vehicle exterior side of the door by a rod, etc. (not shown);
a standard switch plate 26 disposed in the casing 5;
a door opening/closing detection switch 27 mounted on the standard switch plate 26, and detecting the opening/closing state of the door; and
a locking/unlocking detection switch 28 mounted on the standard switch plate 26, and detecting the locking/unlocking state of the door.

In addition, the locking/unlocking motor 11, the door opening/closing detection switch 27, and the locking/unlocking detection switch 28 correspond to the standard electric parts in the present invention.

The worm wheel 14 rotates forward and reverse from a neutral position against an urging force of a spring 29 based on forward and reverse rotation of the locking/unlocking motor 11. When the rotation of the locking/unlocking motor 11 is stopped, the worm wheel 14 automatically returns from the rotated position to the neutral position by the urging force of the spring 29.

The locking/unlocking lever 16 has a tooth portion 161 which engages with a tooth portion 141 provided at the center portion of the worm wheel 14. By forward and reverse rotation of the worm wheel 14 based on the rotation of the locking/unlocking motor 11, the locking/unlocking lever 16 is rotated to the unlocking position that enables the open operation of the door by the outside handle and the locking position that disables the open operation of the door by the outside handle.

The knob lever 18 rotates to the unlocking position and the locking position based on the unlocking operation and the locking operation of the locking knob. When the locking knob is operated to be locked, the knob lever 18 rotates counterclockwise from the unlocking position shown in FIG. 1 by a predetermined angle and moves to the locking position. At this time, the locking/unlocking lever 16 connected to the knob lever 18 and the opening link 19 connected to the locking/unlocking lever 16 are rotated to the unlocking position enabling the open operation of the door by the outside handle, and the locking position disabling it.

The inside lever 21 rotates counterclockwise in FIG. 1 based on the opening operation of the inside handle. Regardless of the position of the locking/unlocking lever 16, the releasing portion 211 facing the rear abuts against a lower surface of the released portion 101 of the end portion on the vehicle interior side of the opening lever 10, and rotates the opening lever 10. As a result, the ratchet that rotates integrally with the opening lever 10 is rotated in the releasing direction for releasing the engagement with the latch 9, thus, the engagement between the latch 9 and the striker is released, and the door can be opened.

The key lever 23 is connected to the locking/unlocking lever 16, and is rotated from the neutral position to the unlocking direction or the locking direction based on the operation of the key cylinder. Thus, the key lever 23 rotates the locking/unlocking lever 16 to the unlocking position that enables the opening operation of the door by the outside handle, or to the locking position that disables the opening operation of the door by the outside handle.

In the opening link 19, a lower portion thereof is connected to a connecting end portion 251 on the vehicle interior side of the outside lever 25 so as to be rotatably by a predetermined angle in the front-rear direction, and an upper portion thereof is connected to the locking/unlocking lever 16 so as to be slidably in the vertical direction. In conjunction with the rotating operation of the locking/unlocking lever 16, the opening link 19 moves from the unlocked position shown in FIG. 1 to the locking position which rotates counterclockwise around the connecting end portion 251 of the outside lever 25 by a predetermined angle. When the opening link 19 is in the unlocking position, an upper surface of the releasing portion 191 provided at the intermediate portion in the vertical direction of the opening link 19 can abut against the lower surface of the released portion 101 of the opening lever 10.

When the door is in a completely closed state, and the locking/unlocking lever 16 and the opening link 19 are in the unlocking position, in the case that the outside lever 25 performs a releasing actuation based on the opening operation of the outside handle, the opening link 19 moves upward and rotates the open lever 10 in the releasing direction, thus, the engagement state between the ratchet and the latch 9 is released and the door can be opened.

In addition, when the door is in a completely closed state, and the locking/unlocking lever 16 and the opening link 19 are in the locking position, even if the opening link 19 moves upward by the releasing actuation of the outside lever 25, the unlocking portion 191 moves with idle swing state toward the released portion 101 of the open lever 10, so that the door cannot be opened.

As shown in FIGS. 3 to 6, the standard switch plate 26 has a shape that can be housed in the upper portion and the front upper portion in the casing 5, and comprises:

a plurality (five) of conductive plates 30 conductive to the locking/unlocking motor 11, the door opening/closing detection switch 27 and the locking/unlocking detection switch 28; and a resin plate 31 concealing the conductive plate 30 by insert molding, wherein a female connector 32 made of synthetic resin projecting forward from the casing 5 and opening forward is integrally molded at the front end of the resin plate 31. An external male connector (not shown) connected to the wire harness wired in the door is inserted to this female connector 32. The external male connector is electrically connected to a control circuit device, etc. through a wire harness.

Connection terminals 301 to the locking/unlocking motor 11 in each conductive plate 30 are exposed from the side surface of the vehicle exterior side of the resin plate 31 in order to connect to the locking/unlocking motor 11 disposed in the casing 5. Connection terminals 302, 303 to the door opening/closing detection switch 27 and the locking/unlocking detection switch 28 in each conductive plate 30 are respectively exposed in switch accommodating portions 311 and 312 or accommodating the door opening/closing detection switch 27 and the locking/unlocking detection switch 28 formed on the side surface of the vehicle interior side of the rear end portion of the resin plate 31, and are respectively connected to the door opening/closing detection switch 27 and the locking/unlocking detection switch 28 in the switch accommodating portions 311 and 312. Further, a plurality of pin-shaped standard connection terminals 304 connected to the external male connector for each conductive plate 30 are projected into the female connector 32 so as to face the direction (forward) in which the external male connector is connected.

Figure 4:
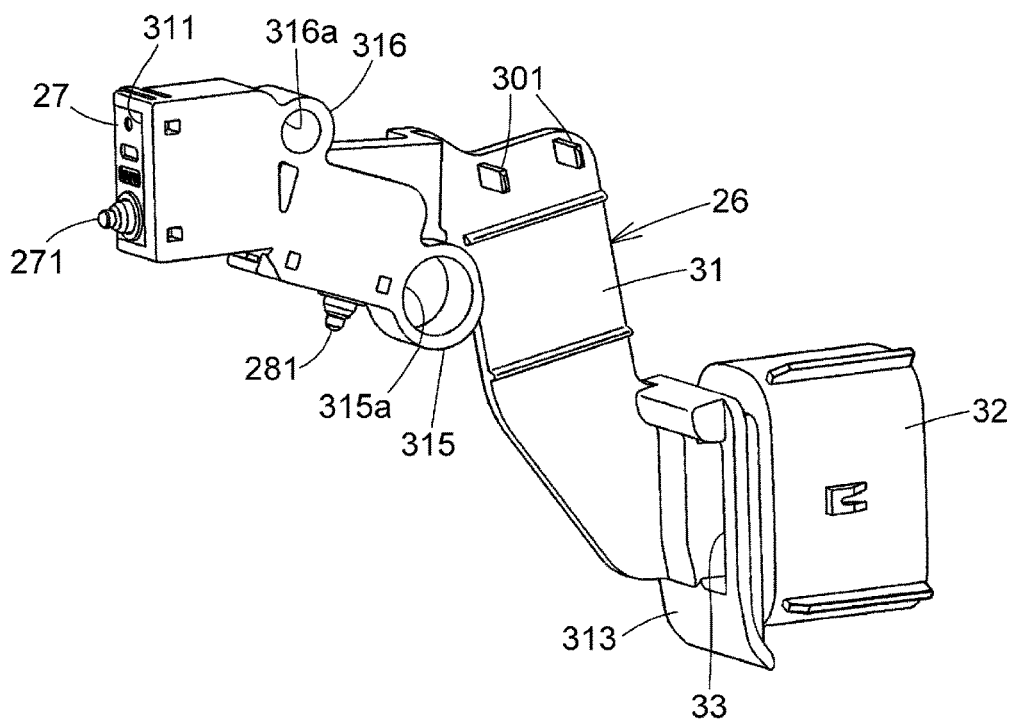
FIG. 4 is a perspective view of the standard switch plate viewed from the vehicle exterior side.
Figure 6:
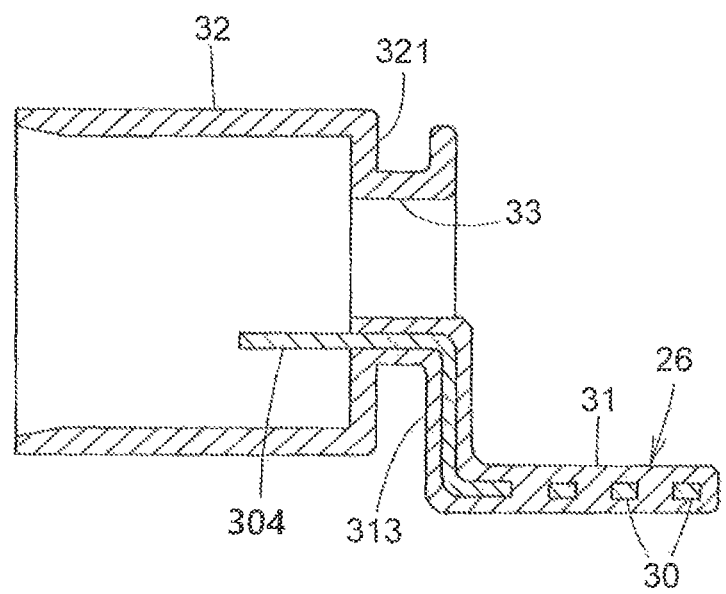
FIG. 6 is an enlarged horizontal cross-sectional view taken along the line VI-VI in FIG. 3.

As shown in FIGS. 4 and 6, at the front end portion of the resin plate 31, a bent portion 313 bent substantially right angle to the plate thickness direction of the resin plate 31 (that is, the vehicle outward direction) is formed. The female connector 32 is integrally formed on the front surface of the bent portion 313.

Figure 5:
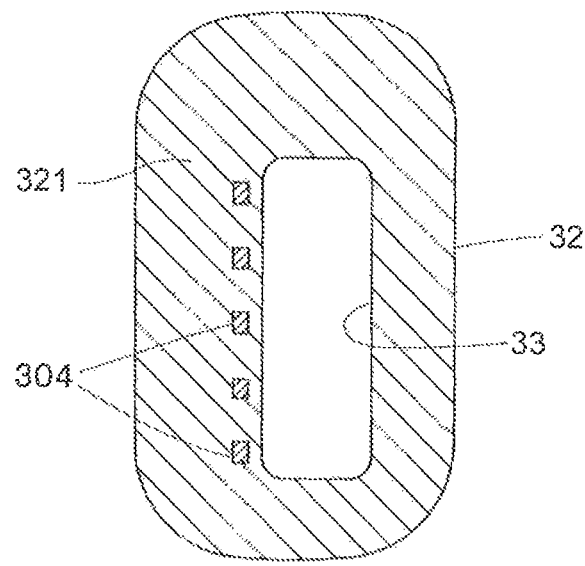
FIG. 5 is an enlarged vertical cross-sectional view taken along the line V-V in FIG. 3.

As shown in FIGS. 5 and 6, on the bent portion 313, and the wall portion 321 of the part into which the standard connection terminals 304 are not inserted at the base end portion of the female connector 32, a longitudinal substantially rectangular connecting hole 33 that a connecting portion 495 of a special switch plate 46 described later can fit from the rear is formed penetrating in the front-rear direction. In this way, when the female connector 32 is provided at the bent portion 313 facing the thickness direction of the resin plate 31, the connecting portion 495 of the second switch plate 46 can be easily fitted to the connecting hole 33 of the female connector 32 from the rear. The plurality of standard connection terminals 304 for each conductive plate 30 are projected into the female connector 32 from the vehicle interior side (the left side in FIG. 5 and the lower side in FIG. 6) close to the connecting hole 33.

The door opening/closing detection switch 27 with a retractable switch pin 271 facing rearward is accommodated in the switch accommodating portion 311 of the resin plate 31 without any gap. The locking/unlocking detection switch 28 with a retractable switch pin 281 facing obliquely rearward and downward is accommodated in the switch accommodating portion 312 of the resin plate 31 without any gap. The door opening/closing detection switch 27 and the locking/unlocking detection switch 28 are held by a pair of elastic holding pieces 314, 314 which are provided in the switch accommodating portions 311, 312 respectively and have retaining claws facing inward each other at their tip portions.

Figure 3:
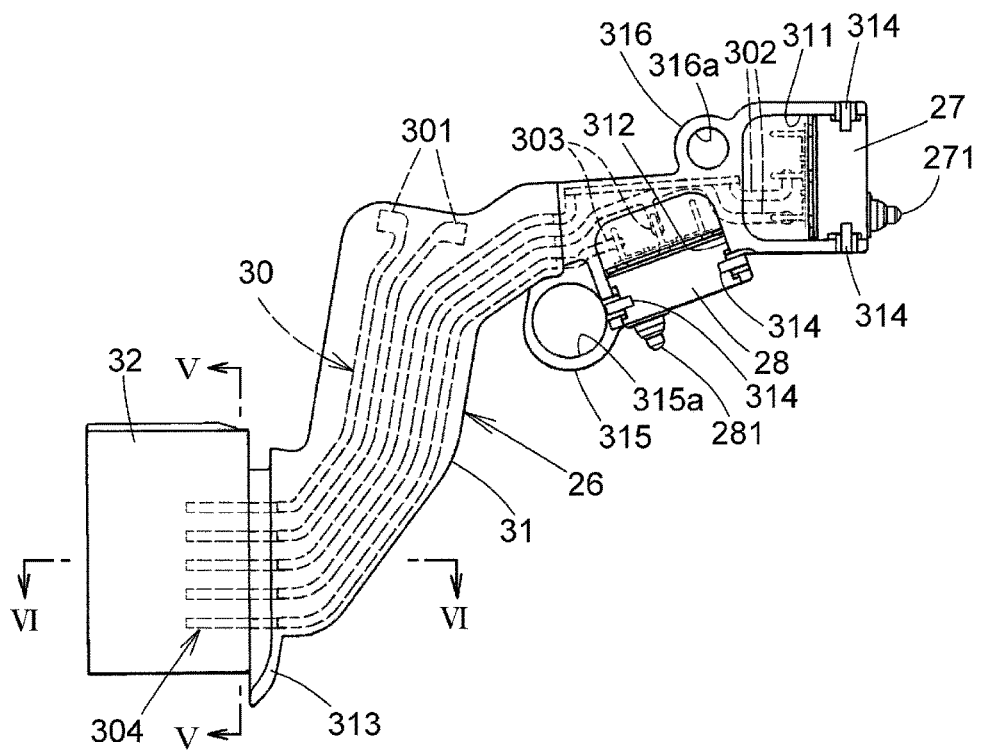
FIG. 3 is a side view of a standard switch plate viewed from the vehicle interior side.

As shown in FIGS. 1 and 3, on the upper portion of the resin plate 31, a fitting portion 315 having a shaft hole 315a which can be fitted to a projection (not shown) provided in the casing 5 and facing the vehicle interior direction, and a fitting portion 316 having a shaft hole 316a which can be fitted to a projection (not shown) projected on the upper end of the casing 5 and facing the vehicle interior direction are integrally formed so as to be spaced obliquely upward and downward. By fitting the fitting portions 315 and 316 to the projections respectively, the standard switch plate 26 is accommodated in the casing 5 in a state being positioned.

As shown in FIG. 1, the switch pin 271 of the door opening/closing detection switch 27 is pushed by a detection lever 34 which is pivotally supported by the body 6 of the engagement unit 2 and is rotated by contacting with the outer peripheral surface of the latch 9. That is, when the latch 9 is rotated to the full latch position (the door fully closed position), the door opening/closing detection switch 27 comes into an off-state, and when the latch 9 is rotated to the half latch position (the door slightly open position) or the open position, the door opening/closing detection switch 27 comes into an on-state, then turns on a room lamp of the vehicle and notifies that the door is the slightly open state or the open state. Although not shown in the drawings, the depth dimension of the switch accommodating portion 311 of the standard switch plate 26 may be set to be large to accommodate the two door opening/closing detection switches 27, so that, when one of the door opening/closing detection switches 27 does not operate due to a failure, the other door opening/closing detection switch 27 can be operated so as to turn on the room lamp, etc.

The switch pin 281 of the locking/unlocking detection switch 28 can contact a cam surface 162 formed on an upper surface of the locking/unlocking lever 16. When the locking/unlocking lever 16 is switched to the unlocking position (the position shown in FIGS. 1 and 2) or the locking position (the clockwise direction in FIG. 1) by either the locking/unlocking motor 11, the knob lever 18 or the key lever 23, the locking/unlocking detection switch 28 transmits a on or off signal to the control circuit, etc. Thus, the unlocking state and the locking state of the door are detected. In addition, when the locking/unlocking lever 16 is switched to the unlocking position or the locking position by the locking/unlocking motor 11, at the same time that the locking/unlocking detection switch 28 is operated, the locking/unlocking motor 11 is automatically stopped.

Figure 7:
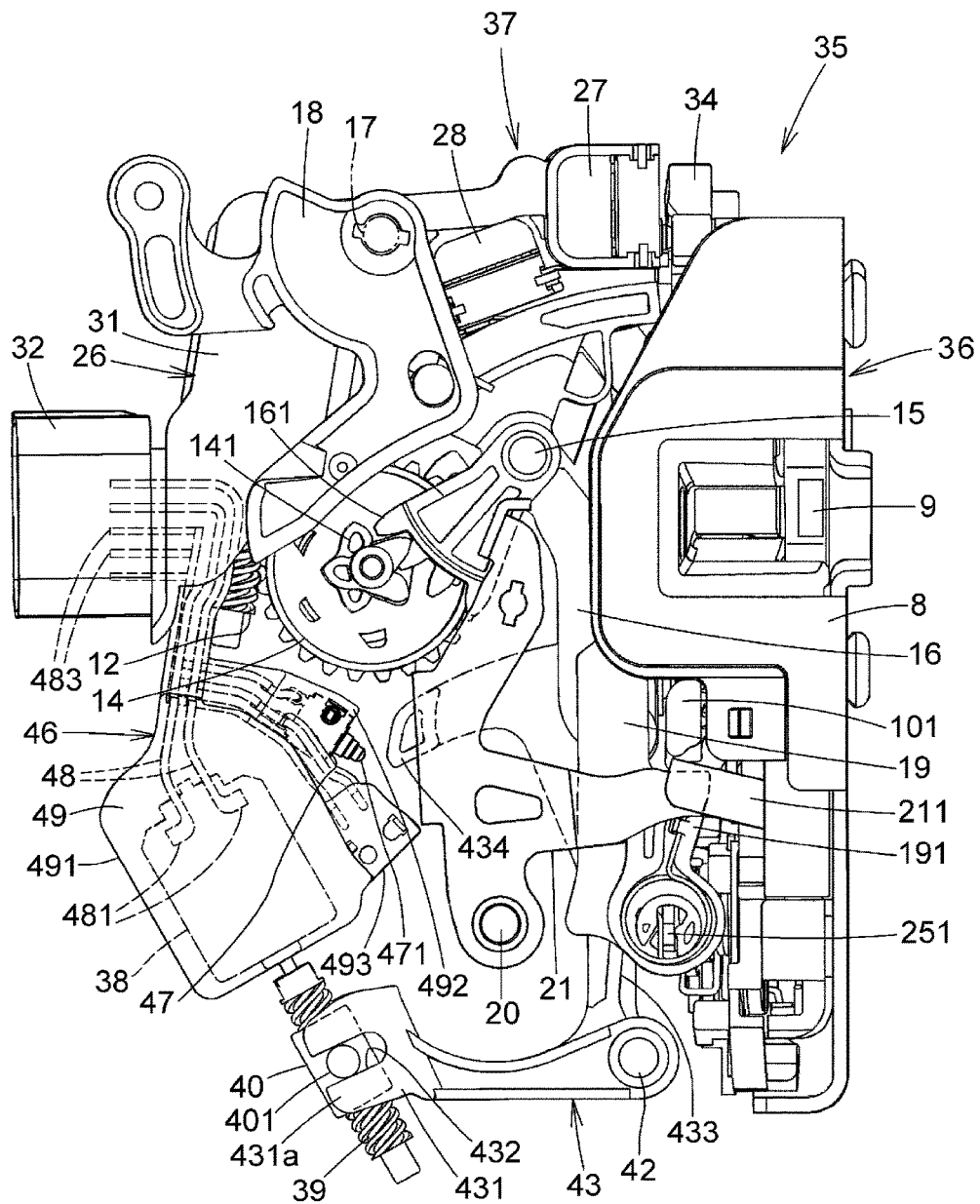
FIG. 7 is a side view of a special type door latch device with a double locking mechanism viewed from the vehicle interior side.
Figure 8:
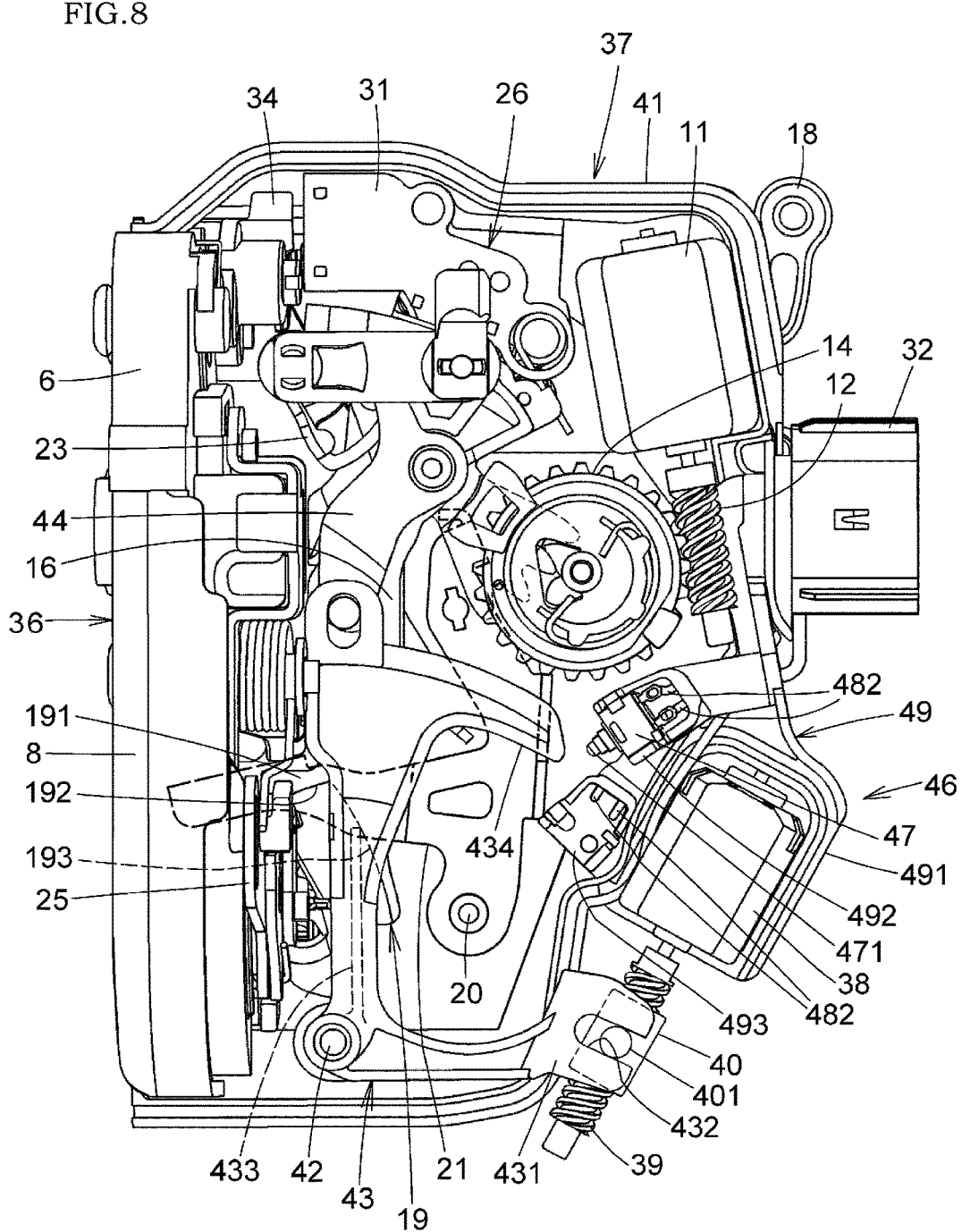
FIG. 8 is a side view of the special type door latch device viewed from the vehicle exterior side.
Figure 9:
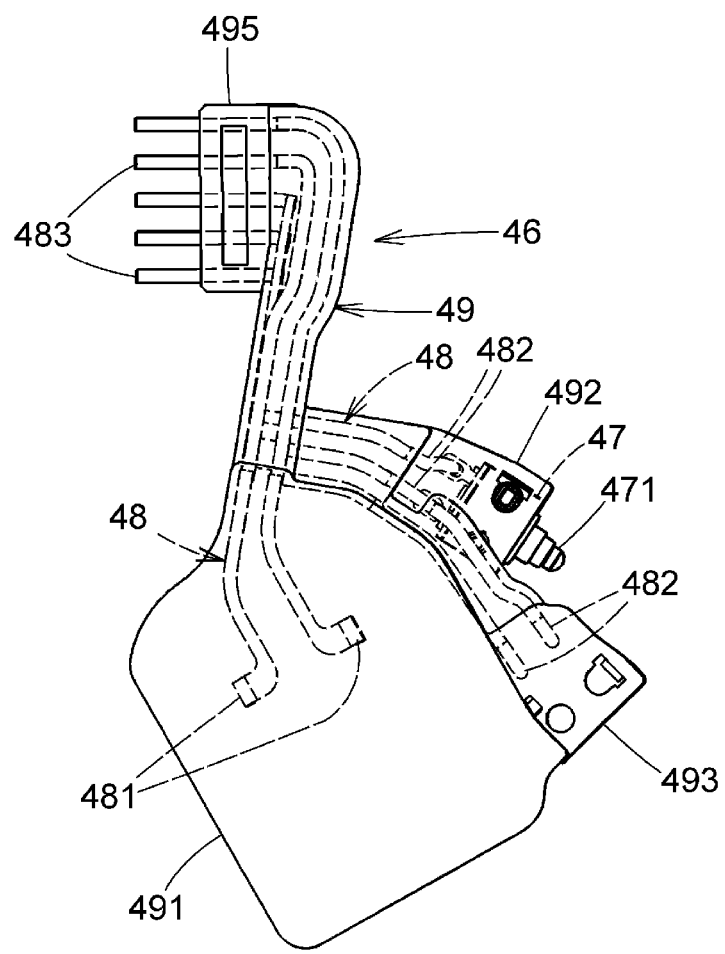
FIG. 9 is a side view of a special switch plate in the special type door latch device viewed from the vehicle interior side.
Figure 10:
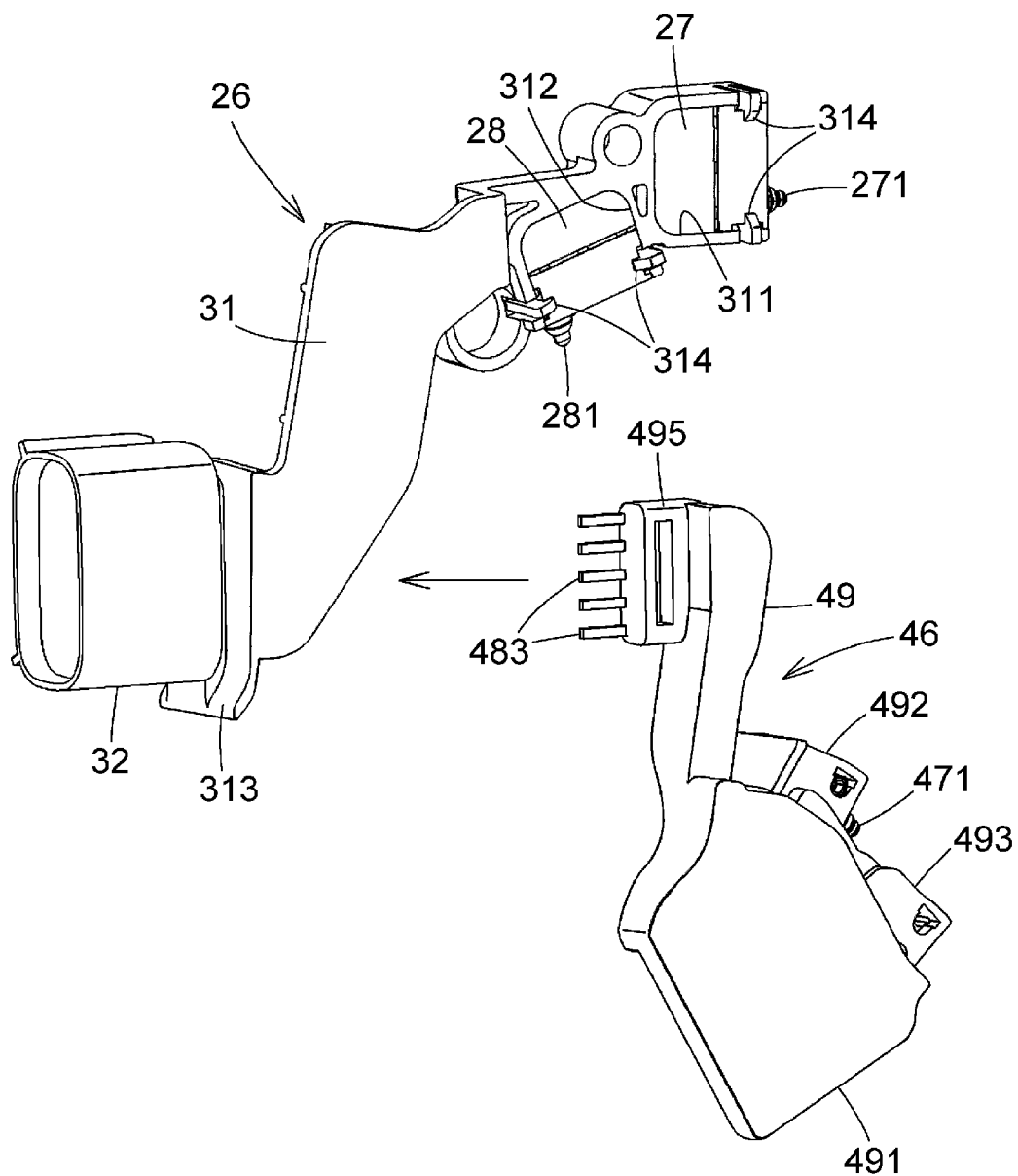
FIG. 10 is a perspective view of the standard switch plate and the special switch plate before being connected viewed from the front of the vehicle.
Figure 11:
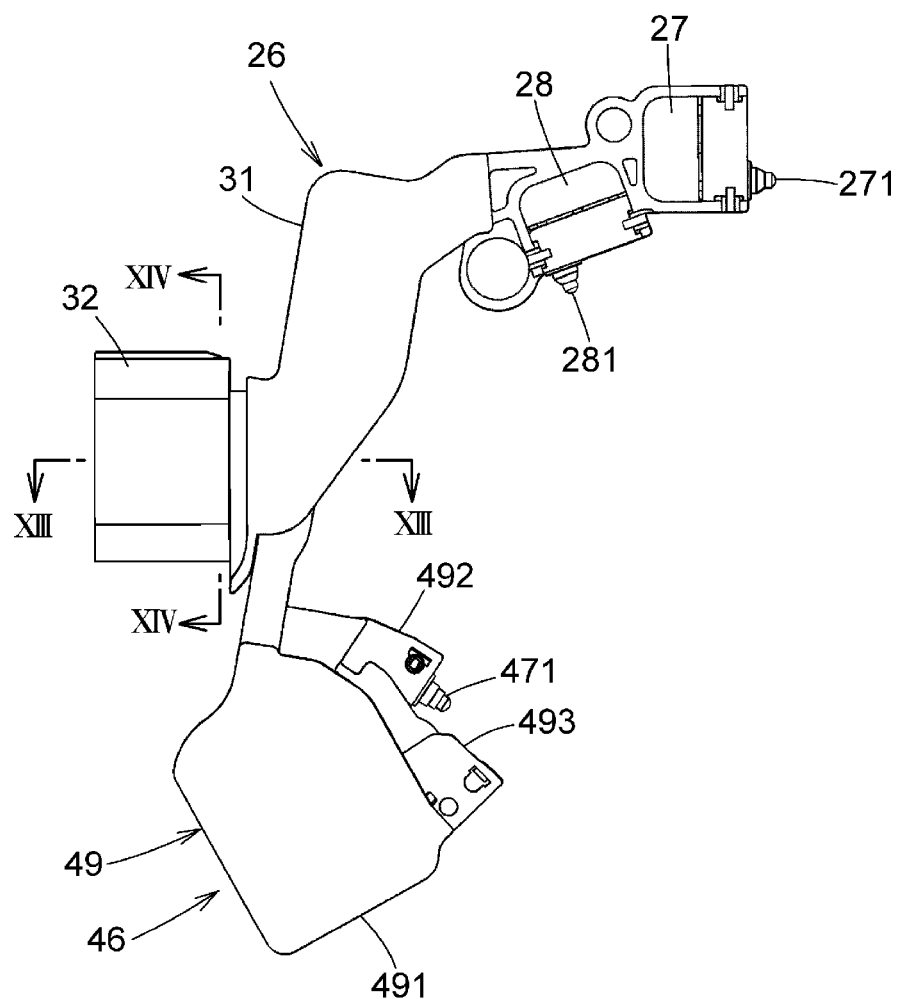
FIG. 11 is a side view of the standard switch plate and the special switch plate after being connected viewed from the vehicle interior side.

FIG. 7 is a side view of a special type door latch device 35 which enables double locking for preventing unlocking state by illegal operation viewed from the vehicle interior side with the cover and the casing removed. FIG. 8 is a side view of the special type door latch device in FIG. 7 viewed from the vehicle exterior side with the casing removed. The door latch device 35 is a special type with a double locking mechanism which is added a double locking motor 38 and a double locking detection switch 47 described later which are special electric parts to the standard type door latch device 1 described above.

In addition to the double locking motor 38 which can rotate forward and backward and the double locking detection switch 47 which are added to the actuator unit 3 described above, the actuator unit 37 applied to the special type door latch device 35 is provided with:

a helical gear 39 rotated by the double locking motor 38;

a cylindrical moving member 40 screwed into the helical gear 39 and moving in the axial direction by its rotation;

a double locking lever 43 having a substantially U-shape in a side view, a rear lower end portion thereof is pivotally mounted on a shaft 42 provided on the casing 41 and a front end portion thereof is connected to a moving member 40;

a connecting lever 44 pivotally mounted on a shaft 15 of the locking/unlocking lever 16, a lower end portion of the connecting lever 44 is connected to an upper end portion of the double locking lever 43; and a special switch plate 46 having a shape conductive to the special electric parts such as the double locking motor 38 and the double locking detection switch 47.

In the following, the description about the same members as the actuator unit 3 of the above-described door latch device 1 will be omitted, and since the double locking mechanism of the actuator unit 37 is not directly related to the present invention, only the action of the double locking lever 43 will be briefly described below.

The double locking lever 43 is provided on the vehicle outer side of the opening link 19 so that a part of the portion facing in the vertical direction of the double locking lever 43 overlaps with a part of the side surface of the vehicle exterior side of the opening link 19. At the front end portion of the double locking lever 43, a two-forked connecting portion 431 interposable the moving member 40 from the rear is formed. A U-shaped cut-out groove 432 formed in a pair of clamping pieces 431a of the connecting portion 431 is fitted from the rear to a pair of driving pins 401 projecting from the moving member 40 and facing a vehicle interior and exterior direction. Thus, the double locking lever 43 is connected to the moving member 40.

When the door is in the locking state, the portable remote control switch, etc. are double-locked, and the double locking motor 38 is rotated, the moving member 40 moves downward in accordance with the rotation thereof. Thus, the double locking lever 43 is rotated from the double unlocking position shown in FIGS. 7 and 8 to a double locking direction (counterclockwise direction in FIG. 7, clockwise direction in FIG. 8) by a predetermined angle around the shaft 42.

When the double locking lever 43 is rotated to the double locking position, a block rib 433 (refer to FIG. 8) provided on the double locking lever 43 approaches and faces the block wall portion 193 of the front side of the vehicle exterior side of the opening link 19 rotated to the locking position together with the locking/unlocking lever 16, and a double locking state is established in a recessed portion 192 provided on the side face. When the double locking lever 43 is rotated to the double locking position, a tip portion of a forward extending portion 434 formed at an upper end portion of the double locking lever 43 and extending forward contacts a switch pin 471 of the double locking detection switch 47 attached to the special switch plate 46 and pushes it. By pushing the switch pin 471, a double locking signal is transmitted to the control circuit device, etc. and the rotation of the double locking motor 38 is stopped.

In this double locking state, when the locking knob in the vehicle is unlocked, the locking/unlocking lever 16 connected to the knob lever 18 and the opening link 19 connected to the locking/unlocking lever 16 tend to rotate from the locking position to the unlocking position (the position shown in FIG. 7). However, the block wall portion 193 of the opening link 19 abuts against the block rib 433 of the double locking lever 43 stopped at the double locking position, so that the rotation of the opening link 19 and the locking/unlocking lever 16 to the direction of the unlocking position is prevented. Therefore, when being in the double locking state, not only the door opening operation by the outside handle of the door but also switching from the locking state to the unlocking state is prevented.

In order to release the double locking state, the double locking motor 38 is rotated to the unlocking direction by the double unlocking operation of a portable remote control switch, etc. so that the double locking lever 43 is switched to the double unlocking position shown in FIGS. 7 and 8, or by unlocking operation with the key cylinder, the key lever 23 is rotated to the unlocking position (counterclockwise direction in FIG. 8) so that the double locking lever 43 is switched to the double unlocking position through the double locking release lever 44 that an upper end portion thereof is linked to the key lever 23.

As shown in FIGS. 9 to 15, the special switch plate 46 comprises a plurality of conductive plates 48 and a resin plate 49 for concealing them by insert molding. In addition, the five conductive plates 48 are provided in order to energize the double locking motor 38 and the double locking detection switch 47, and also, in order to be able to energize a child locking detection switch (not shown) when the special switch plate 46 is shared with another actuator unit having a power child locking mechanism.

A wide motor cover portion 491 capable of covering the double locking motor 38 from the vehicle interior side is integrally formed at the lower portion of the resin plate 49. Connection terminals 481 to the double locking motor 38 in the conductive plates 48 are projected from the surface of the vehicle exterior side of the motor cover portion 491 (refer to FIG. 12). At the upper portion of the motor cover portion 491, a switch accommodating portion 492 which opens to the vehicle exterior side for accommodating the double locking detection switch 47, and, when the actuator-unit having the power child locking mechanism is shared with, a switch accommodating portion 493 which opens to the vehicle exterior side for accommodating the child locking detection switch are integrally molded.

Figure 12:
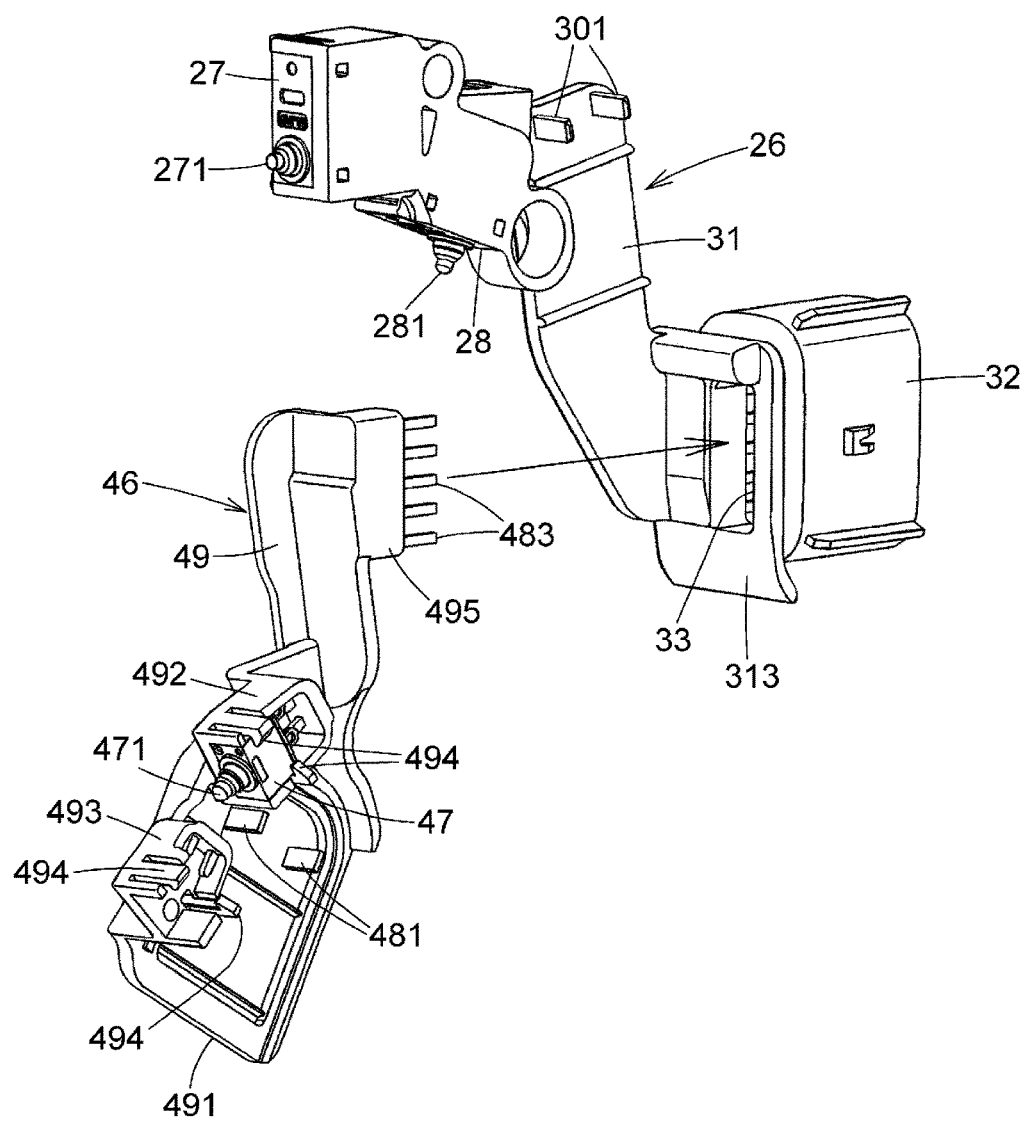
FIG. 12 is a perspective view of the standard switch plate and the special switch plate before being connected viewed from the rear of the vehicle.
Figure 13:
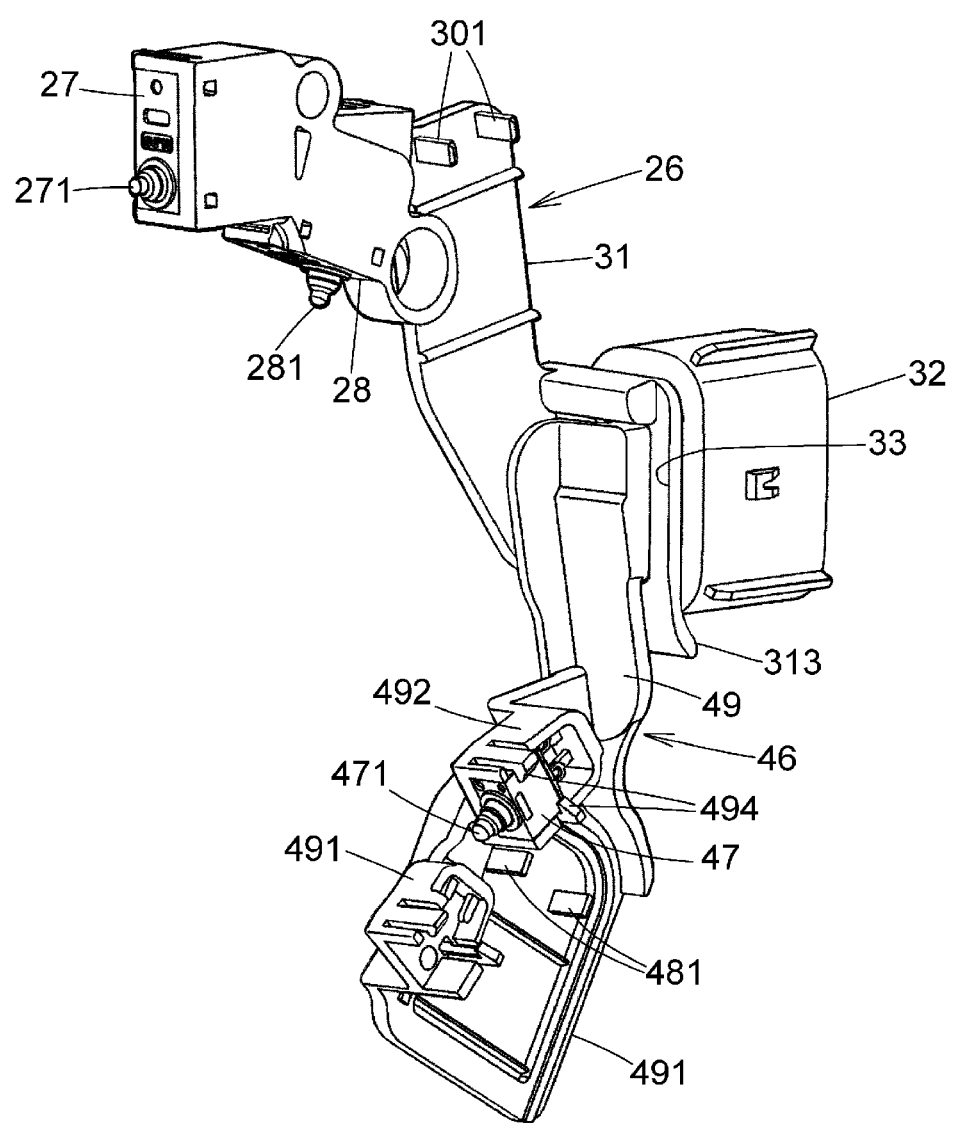
FIG. 13 is a perspective view of the standard switch plate and the special switch plate after being connected viewed from the rear of the vehicle.
Figure 14:
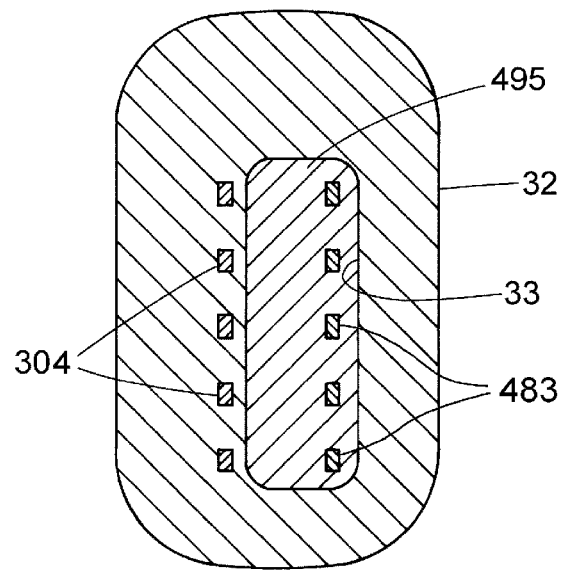
FIG. 14 is an enlarged vertical cross-sectional view taken along the line XIV-XIV in FIG. 11.
Figure 15:
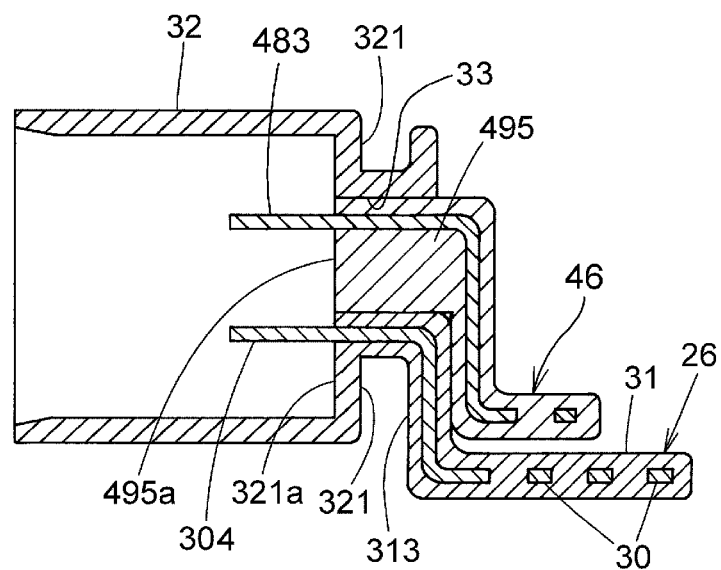
FIG. 15 is an enlarged horizontal cross-sectional view taken along the line XV-XV in FIG. 11.

In each switch accommodating portion 492, 493, in order to hold the double locking detection switch 47 and the child locking detection switch respectively, a pair of elastic holding pieces 494, 494 having retaining claws facing inward each other at their tip portions are provided (refer to FIG. 12). Connection terminals 482 to the double locking detection switch 47 and the child locking detection switch (not shown) in each conductive plate 48 are exposed in the switch accommodating portions 492, 493.

On the front upper portion of the resin plate 49 in the special switch plate 46, a connecting portion 495 which can be fitted from the rear into the connecting hole 33 provided in the female connector 32 of the standard switch plate 26 is integrally formed facing forward. A plurality of pin-shaped special connection terminals 483 connected to the external control circuit device, etc. in the plurality of conductive plates 48 are projected forward from a position deviated to the vehicle exterior side of the connection portion 495. A cross-sectional shape of the connecting portion 495 has the same shape as the connecting hole 33 of the female connector 32, when the connecting portion 495 is fitted into the connecting hole 33, the outer peripheral surface of the connecting portion 495 comes into surface contact with the inner peripheral surface of the connecting hole 33. Thus, by the contact frictional force of these, it is prevented that the connecting portion 495 is come off from the connecting hole 33 (refer to FIGS. 14 and 15).

As shown in FIGS. 12 to 15, the connecting portion 495 of the special switch plate 46 is detachably fitted to the connecting hole 33 provided in the bent portion 313 and the female connector 32 of the standard switch plate 26 from the opposite side (rear side) of the female connector 32. Thus, the special switch plate 46 is connected to the standard switch plate 26. After connection, the end surface 495*a* of the connecting portion 495 is aligned with a same level as the end surface 321*a* of the wall portion 321 which is the opening end surface of the connecting hole 33 of the female connector 32, and an end surface of the external male connector can come into surface contact with the end surfaces 321*a*, 495*a*.

When the special switch plate 46 is connected to the standard switch plate 26, the plurality of special connection terminals 483 of the special switch plate 46 are separated from the plurality of standard terminals 304 of the standard switch plate 26, and are projected so as to face the same direction (the direction in which the external male connector is connected). The male connector of a wire harness connected to an external control circuit device, etc. is inserted into the female connector 32 and a plurality of tubular terminals of the male connector are inserted into each pin-shaped connection terminal 304, 483. Thus, it is possible to energize both the standard switch plate 26 and the special switch plate 46 which are different in installation position and shape. That is, by sharing the connector for the standard switch plate 26 of a standard type door latch device 1 comprising the standard electric parts such as the locking/unlocking motor 11, the door opening/closing detection switch 27, a locking/unlocking detection switch 28, and the connector for the special switch plate 46 of the special type door latch device 35 which attaches the special electric parts such as the double locking motor 38, the double locking detection switch 47 to the standard type door latch device 1, it is possible to consolidate into one female connector 32 and to energize both the standard switch plate 26 and the special switch plate 46 by this single female connector 32. Further, when the special switch plate 46 is detached from the female connector 32, it is possible to use as it is as the standard switch plate 26 for the above-described standard type door latch device 1.

As described above, in the present invention, it is possible to share the female connector 32 provided in the standard switch plate 26 of the standard type door latch device 1, and the connector used for the special switch plate 46 for the special type door latch device 35 which is added the double locking mechanism. Therefore, it is not necessary to separately energize the standard electric parts such as the locking/unlocking motor 11, and the special electric parts such as the double locking motor 38 with the two connectors as conventionally. Thus, the electric parts such as the motor 11 and the motor 38 can be energized by the female connector 32 integrated into one piece, so that the connection work between the female connector 32 and the external connector can be performed efficiently.

Although the embodiments of the present invention have been described above, the following various variations and modifications can be made to the present embodiment within the scope not deviating from the gist of the present invention.

In the above embodiments, although the special switch plate 46 for the special type door latch device 35 having the double locking mechanism is connected to the standard switch plate 26 for the standard type door latch device 1, a power child locking mechanism in which the child locking mechanism is automatically brought into a locking state or an unlocking state, that is, a special switch plate for a special type door latch device comprising special electric parts such as a child locking motor and a child locking detection switch may be connected.

Figure 16:
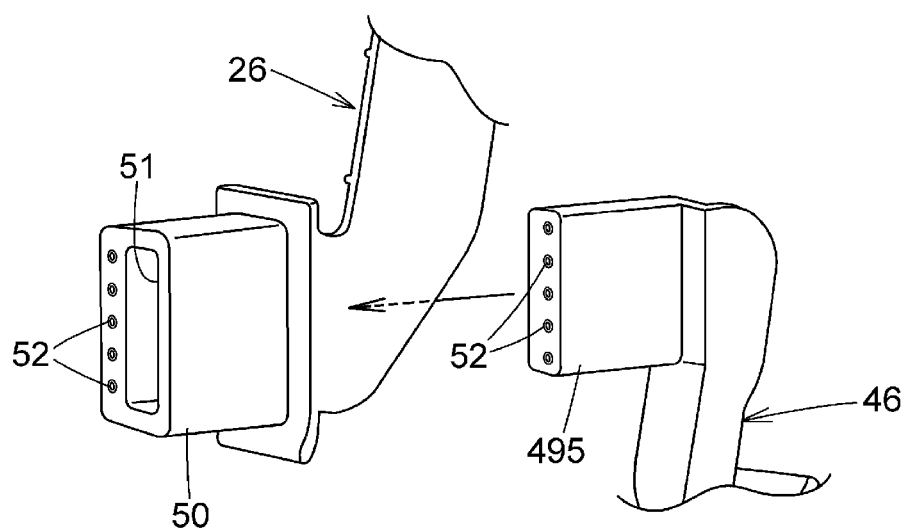
FIG. 16 is a perspective view of the main parts showing the modified examples of a connector of the standard switch plate and a special switch plate connected to the connector.

In the above embodiments, although the connector of the standard switch plate 26 is the female connector 32, when the external connector is a female connector, as shown in FIG. 16, the connector of the standard switch plate 26 is to be a male connector 50 that the external female connector can be connected. The male connector 50 may be provided with a connecting hole 51 that a connecting portion 495 of the special switch plate 46 or a connecting portion of a child locking special switch plate (not shown) is fitted. In this case, a plurality of special connection terminals 52 of the male connector 50 and the connecting portion 495 are tubulars of which tip portions are exposed from the end surfaces of the male connector 50 and the connecting portion 495. Pin-shaped terminals of the external female connector are inserted into these special connection terminals 52.

What is claimed is:

1. A vehicle door latch device comprising:
   a casing;
   a standard electric part disposed in the casing;
   a standard switch plate disposed in the casing and conductive to the standard electric part; and
   a connector provided on the standard switch plate and having a standard connection terminal electrically connected to an external connector,
   wherein the connector, in a portion not having the standard connection terminal, has a connecting through hole which penetrates in a connection direction of the external connector.

2. The vehicle door latch device according to claim 1, wherein the connector is a female connector in which the standard connection terminal is projected inside the female connector, and the connecting through hole is provided in a wall portion of a base end portion of the female connector.

3. A vehicle door latch device comprising:
   a casing;
   a standard electric part and a special electric part disposed in the casing;
   a standard switch plate disposed in the casing and conductive to the standard electric part;
   a special switch plate disposed in the casing and conductive to the special electric part;
   a connector provided on the standard switch plate and having a standard connection terminal electrically connected to an external connector; and
   a connecting portion provided on the special switch plate and having a special connection terminal electrically connected to the external connector,
   wherein the connector, in a portion not having the standard connection terminal, has a connecting through hole which penetrates in a connection direction of the external connector, and the connecting portion of the special switch plate is fitted in the connecting through hole.

4. The vehicle door latch device according to claim 3, wherein the connector is a female connector in which the standard connection terminal is projected inside the female connector, and the connecting through hole is provided in a wall portion of a base end portion of the female connector.

5. The vehicle door latch device according to claim 3, wherein an end surface of the connecting portion is aligned with a same level as an end surface of a wall portion of the connecting through hole, when the connecting portion of the special switch plate is fitted in the connecting through hole.

6. The vehicle door latch device according to claim 5, wherein the connecting portion is fitted in the connecting through hole so that the connecting through hole and the connecting portion have a same cross-sectional shape and an outer peripheral surface of the connecting portion comes into surface contact with an inner peripheral surface of the connecting through hole.

7. The vehicle door latch device according to claim 3, wherein a bent portion, bent in a plate thickness direction of the standard switch plate, is formed at an end portion of the standard switch plate, the connector is provided on a surface of the bent portion that is opposite to the standard switch plate, and the connecting portion of the special switch plate penetrates the bent portion and is fitted into the connecting through hole from an opposite side of the connector.

* * * * *